UNITED STATES PATENT OFFICE.

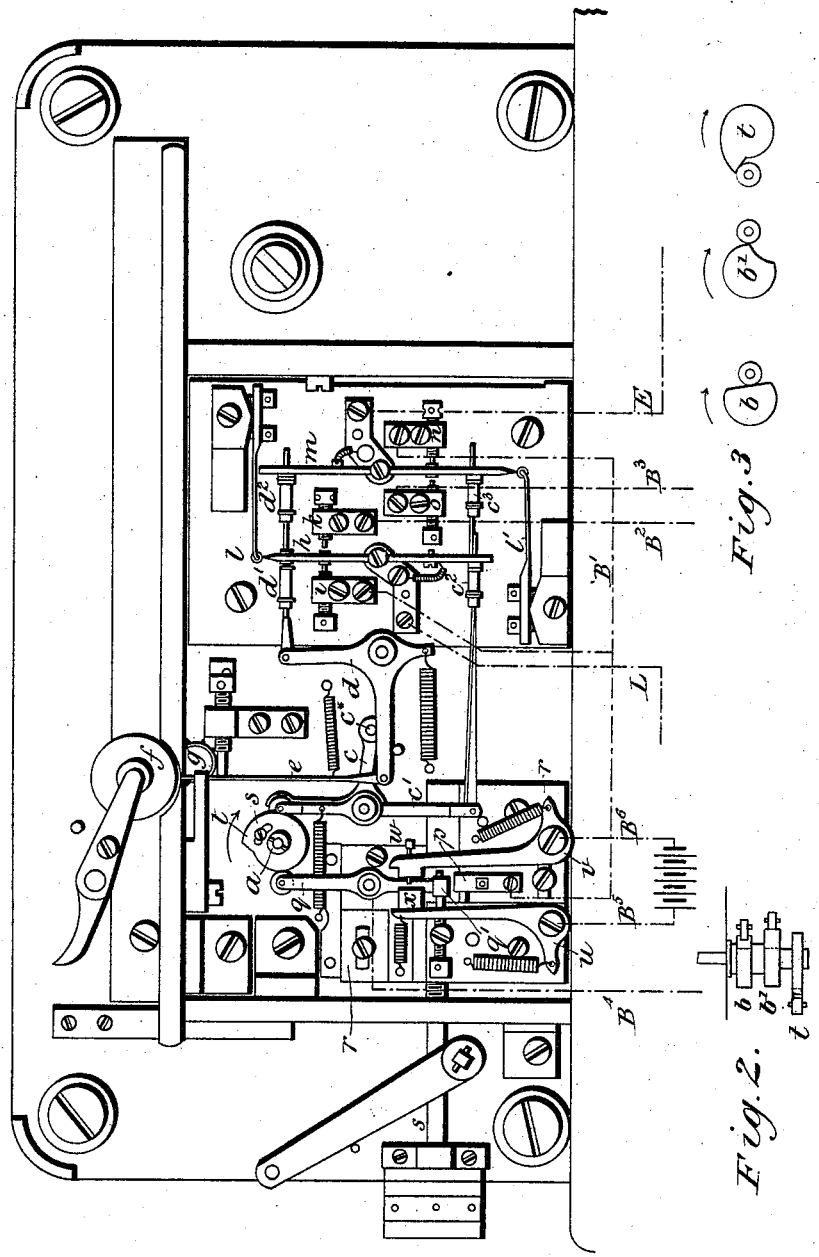

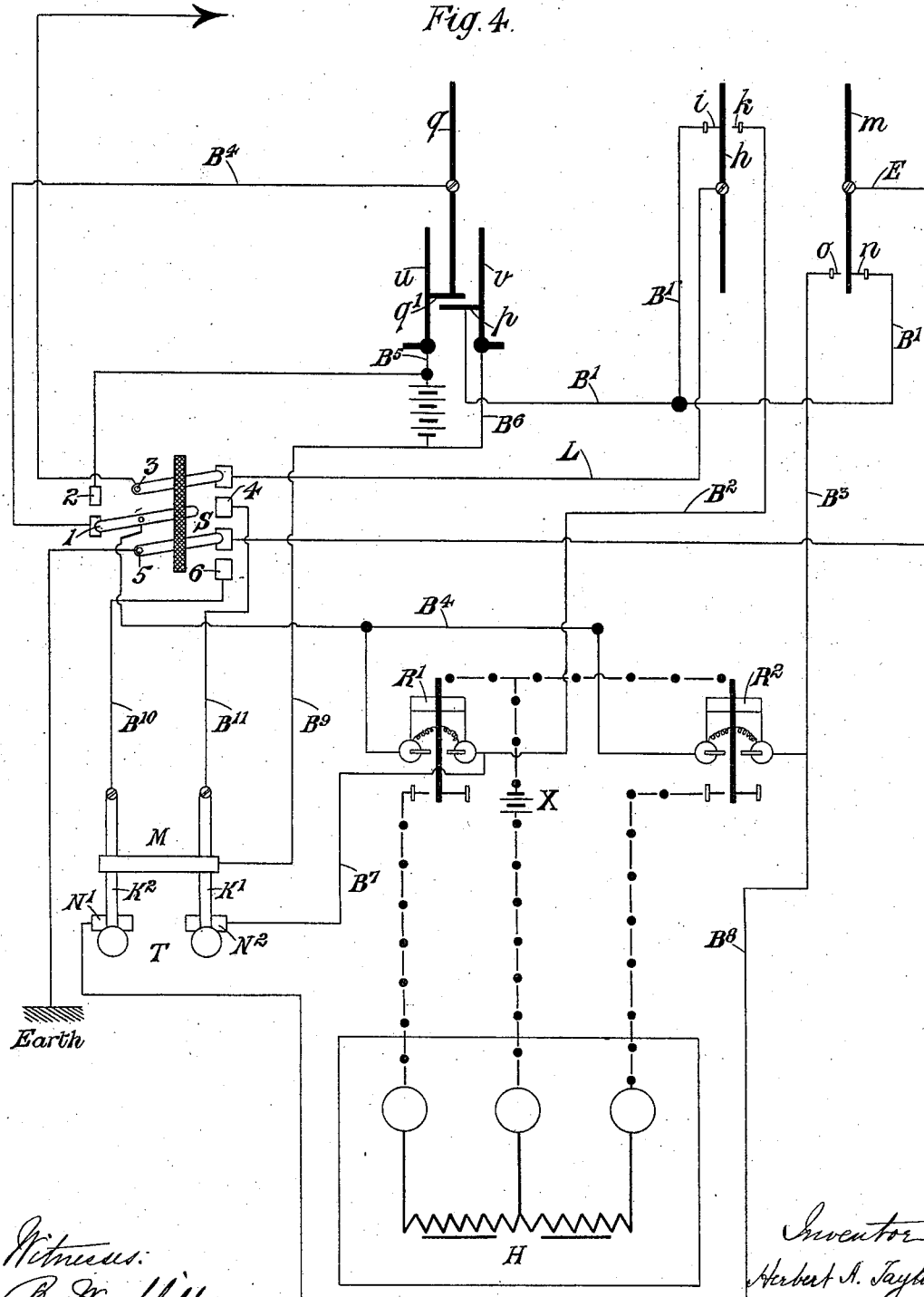

HERBERT ARNAUD TAYLOR, OF LONDON, ENGLAND.

TELEGRAPH-TRANSMITTER.

SPECIFICATION forming part of Letters Patent No. 577,540, dated February 23, 1897.

Application filed November 18, 1895. Serial No. 569,348. (No model.) Patented in England October 30, 1894, No. 20,807.

*To all whom it may concern:*

Be it known that I, HERBERT ARNAUD TAYLOR, a subject of the Queen of Great Britain, residing at London, in the county of Middlesex and Kingdom of England, have invented certain new and useful Improvements in Telegraphic Transmitters, (for which I have obtained a patent in Great Britain, No. 20,807, bearing date October 30, 1894,) of which the following is a specification.

There have lately been introduced modifications of the well-known Wheatstone automatic transmitter adapting it for the transmission of signals on a submarine cable worked on the siphon recorder or mirror system in which the formation of an alphabet depends not on the length of the elements, (dots and dashes,) but on their direction.

To produce an excursion of the receiving organ to the left and its return toward zero, (equivalent to a dot,) the sending end of the cable is applied first to one pole of a battery (say, zinc) and then to "earth," while to produce an excursion to the right and return toward zero (equivalent to a dash) the sending end is applied first to the other pole of the battery and then to earth.

In the Wheatstone automatic transmitter as hitherto constructed for cable-signaling there are two contact-levers, which are controlled in their movements by two needles, and the movemens of the levers are in turn governed by a paper tape which is drawn continuously through the instrument by suitable mechanism. The tape, previous to insertion in the instrument, is punched in accordance with the message to be transmitted. The two contact-levers of the instrument are connected to line and to earth, respectively. They normally rest against contact-points, and these points are both connected with the same pole of the transmitting-battery. When no hole in the paper occurs and neither needle can rise, the contact-levers remain in their normal position, in which the line is connected with earth. When, on the other hand, a hole in the paper tape is presented to the needle, the needle rises through the hole and the corresponding contact-lever is moved over from its normal contact to another contact-point, and this latter is connected with the other pole of the transmitting-battery. Consequently a current then passes in the circuit.

It has been observed when employing automatic transmitters as hitherto in use that the signals received from a cable are smaller when sent automatically than when sent manually with the same battery-power and at the same speed, but this disparity may be removed by prolonging the battery-contact relatively to the earth-contact. Accordingly in my present apparatus, though a needle be immediately withdrawn from the hole in the paper, the contact-lever dwells for a short but regulated period upon the contact-point, after which it is replaced by means of other mechanism.

In order to obtain a more rapid transmission, my invention consists, further, in providing improved means whereby the instrument is so arranged that each current sent from it into the line is immediately followed by another current of opposite sign and of shorter duration after the manner known as "curb-sending." I also provide improved means whereby a record is preserved of the messages transmitted. These means may be used in conjunction with any suitable automatic transmitter, or, combined with the novel hand-key hereinafter described, they are equally well adapted for manual transmission.

In the accompanying drawings, Figure 1 shows in elevation my improved automatic transmitter. Figs. 2 and 3 are detail views, and Fig. 4 is a diagram which serves to show the complete electrical connections adapted for either automatic or manual transmission and to illustrate my novel form of hand-key and the means for preserving a record of the messages transmitted both automatically and manually.

Referring more particularly to Fig. 1 and incidentally to Figs. 2 and 3, $a$ is a cam-shaft driven continuously by clockwork or other motive power, and $b$ and $b'$ are two cams upon the shaft, which impart movement to the two levers $c$ and $c'$, small rollers carried by the levers being kept up to the cams by springs. The angle-lever $c$ carries a pin $c^+$, against which the horizontal limbs of two other angle-levers press. One such angle-lever $d$ only is seen in the figure, another similar lever being immediately behind the first. The lever $d$ carries a needle $e$, and its fellow lever is also provided with a needle. The needles are permitted to oscillate vertically when a perforation in the paper comes or might have come directly over their points. The paper strip or tape is held in place by the wheel $f$ and is propelled by the continuously-revolving wheel $g$. The perforations in the paper permit the movements of the needles upward, but when no perforation occurs in the paper tape they are held just clear of the surface of the paper by means of the cam $b$ and lever $c$. When the needle $e$ rises and the lever $d$, which carries it, rocks, then the pusher $d'$, which the lever carries, thrusts against the contact-lever $h$ and drives it from its stop $i$ to its stop $k$, the point of the lever $h$ passing from side to side beneath the center of the spring-mouthed jockey-roller $l$. Immediately afterward the lever $d$ is carried back by the action of the cam $b$ as it revolves, (see Figs. 2 and 3,) and after a regulated short interval of time the contact-lever $h$ is thrust back again by the pusher $c^2$, which is connected with the lever $c'$ and receives its movement from the cam $b'$. In a precisely similar way the lever behind $d$ actuates a pusher $d^2$, which thrusts upon a contact-lever $m$ and causes it to leave the stop $n$ and pass to the stop $o$. Then after the regulated interval of time the pusher $c^3$, connected with the lever $c'$, thrusts the contact-lever $m$ back to it original position.

$l'$ is a jockey-roller similar to $l$.

The contact-lever $h$ is connected to line by a wire marked L, and the contact-lever $m$ is connected to earth by a wire marked E.

$i$, $n$, $k$, and $o$ are terminals of the sending-battery, $i$ and $n$ being of the same sign and opposite to $k$ and $o$.

It will be seen that in the position of the contact-levers which the drawings indicate the cable is to earth and is also connected with the two battery-terminals $i$ and $n$, which being of like sign no current passes. When either contact-lever is moved, the other remaining stationary, then a current will pass through the cable in one direction or the other, according as one or the other of the contact-levers is moved. Further, it will be seen that the cam $b$ is so shaped that the crank-lever $c$, whose roller rests against the cam, allows the needle-levers to rise at the instant that a signal-hole in the paper is or may be just over the upper end of one or other of the needles and immediately after depresses them, so that the tops of the needles are just below the level of the paper. If when they are allowed to rise by the cam there is no signal-hole in the paper, both needles press for an instant against the lower surface of the paper, but they do not rise sufficiently to move the contact-levers $h$ and $m$; but if there is a signal-hole on either side of the paper the corresponding needle passes through the hole and its contact-lever puts the cable in connection with one pole of the battery. The axis on which the cams are located being rotated continuously by the clockwork or its equivalent, the neutral portion of the cam $b$ beyond the flat comes around to the roller of the lever $c$ immediately after the movement of one of the contact-levers $h$ or $m$ has or may have taken place; and so the levers are brought back to the position shown in the drawings. The contact-levers $h$ $m$, however, remain as they may have been placed so long as the roller of the lever $c$ is upon a neutral portion of the cam and the jockey-rollers hold the contact-levers firmly against their contact-stops. The further rotation of the cam-axis brings the cam $b'$ to operate against the roller of the lever $c'$, and the cam being adjustable upon the axis it can be set to operate sooner or later, as may be desired. The lever $c'$ when moved by the cam $b'$ so operates that the pushers $c^2$ $c^3$ thrust the lower ends of the contact-levers $h$ and $m$ from left to right and bring such contact-levers back to the position shown by the drawings. The pushers, it will be seen, are adjustable along screw-stems, and they should be adjusted to operate in the manner described. The contact-stops are also adjustable. Thus it will be seen that if a needle rises when the flat of the cam $b$ passes the roller of the lever $c$ the connection of the battery with the telegraph-circuit is effectually established, and the connection is continued during as large a portion of the rotation of the cam-shaft as may be desirable and until the cam $b'$ passes the roller of the lever $c'$. Then during the remainder of the rotation of the cam-shaft the telegraph-line becomes connected with earth, (or its equivalent,) the contact-levers $h$ and $m$ then resting against stops, which are connected the one with the other.

Obviously in place of the two cams $b$ and $b'$ a single cam can be made which will operate in the same way, the proper form having been ascertained by experiment, but the double or adjustable cam is the more convenient. For the purpose of curb-sending the instrument may be provided with additional contact-levers, constituting a pole-changer, the motion of which is governed directly by the action of an adjustable cam upon an arbor of the clockwork or its equivalent. The contact-points $i$ and $n$, on which the levers $h$ and $m$ normally rest, and the contact-points $k$ and $o$, to which such levers may pass when moved by the needles, instead of being connected directly with the respective poles of the battery, are then connected therewith through the intervention of the pole-changer, as clearly shown in Fig. 4. In this way in each short interval during which current passes a change of sign is caused to occur after the manner known as "curb-sending," by which each effective impulse is sharply succeeded by an opposite impulse.

According to my invention the terminals $i$ and $n$ are connected by wires B' with the contact-pin $p$, and the terminals $k$ and $o$ are connected directly or indirectly by wires $B^2$ $B^3$ $B^4$ with the lever $q$. The pin $p$ and lever $q$, with other parts of the curbing mechanism, are mounted upon a sliding block $r$, Fig. 1—say of vulcanite—and this can be moved nearer to or farther from the cam-axis by turning the graduated head of the screw $s$. When it is desired to make use of curb-signal currents, the block $r$ is advanced by the screw until the roller at the upper end of the lever $q$ comes more or less within range of the cam $t$ (shown in detail in Figs. 2 and 3) on the axis $a$, and then at each rotation of the axis the lever $q$ is made to rock about its center.

$u$ and $v$ are two levers of the pole-changer, which, as is shown, are directly connected by wires $B^5$ $B^6$ to a battery. They make contact with the pins $p$ and $q'$, but they are never simultaneously in contact with either pin, this being prevented by the adjusting-screw $w$ (see Fig. 1) on the lever pressing against the insulating-block $x$ on the other lever. The levers $u$ and $v$ of the pole-changer I term "battery" contact-levers to distinguish them from the principal contact-levers $h$ and $m$.

The connections may be readily traced from the diagram Fig. 4, which depicts the hand-key T switched out of circuit by the switch device S, and the automatic transmitter ready to be started and in electrical connection with the means for preserving a record of the signal's transmitter. Looking at the figure, battery connection may be traced from $B^5$ and battery contact-lever $u$ to the pin $q'$ on the lever $q$, and thence by the wires $B^4$ and arm 1 of the switch S through relays R' $R^2$ (for the purpose hereinafter shown) to the wires $B^2$ and $B^3$, leading to the contact-stops $k$ and $o$; also, starting from the other pole of the battery, connection may be traced from the battery contact-lever $v$ by pin $p$ and wires B' to the stops $i$ and $n$. If this position of the battery contact-levers $u$ and $v$ were maintained, the signals sent would not be curbed, but the action of the cam $t$, Fig. 1, during its rotation is to rock the lever $q$, and then during the passage of each signal the pin $q'$ passes from battery contact-lever $u$ to battery contact-lever $v$, and lever $v$ leaves while lever $u$ comes to the pin $p$. The circuit can then be traced from $B^5$ to $i$ and $n$ and from $B^6$ to $k$ and $o$. Consequently a reversal takes place during the passage of the signal-current and sooner or later, according to the adjustment of the instrument, by means of the screw $s$. By mounting the pole-changer on the sliding block $r$ I am enabled to adjust the same with great precision and that while the instrument is running. By drawing the block away, so that the lever $q$ completely clears the path of the cam $t$, no curbing whatever takes place, but by moving the block in the reverse direction the lever $q$ is brought under the control of the cam $t$ for a longer or shorter period of each revolution, and the curbing effect is proportional to the amount of such movement.

Premising the switch S to be in its reverse position, (that is, with the arm 1 resting on the contact 2, the arm 3 on contact 4, and the arm 5 on contact 6,) the automatic transmitter will be switched out of and the hand-key T into circuit. In that case battery connection is traceable from $B^5$ through the relays R' $R^2$ to the wires $B^7$ $B^8$ to the two insulated front bars $N^2$ N', respectively, of the key T. The other pole of the battery is connected by the wire $B^9$ to the back bar M of the key. The finger-levers K' $K^2$ are connected by wires $B^{11}$ $B^{10}$ to the switch S, from whence connection is to line and earth, respectively.

It will be apparent that the apparatus, as shown in Fig. 1, may be employed without the additional parts S, T, R', $R^2$, X, and H, (shown in Fig. 4,) in which case the wires $B^4$ $B^2$ $B^3$ would be in direct connection. Obviously also the curbing mechanism might be completely dispensed with, and in that case a very effective plain or "non-curb" instrument would remain, which might be used either with or without the additional parts R', $R^2$, X, and H. Further, the parts T, R', $R^2$, X, and H may be used without the automatic transmitter.

When it is desired to preserve a record of the messages transmitted by the instrument, I provide two relays connected between the battery and the contact-points, to which the contact-levers of the automatic transmitter or the finger-levers of the hand-key pass when moved for the making of a signal. It results from this arrangement that when one contact-lever or its equivalent moves the current entering the cable traverses the coils of one of the relays, and when the other contact-lever moves a current of the same strength and polarity passes to earth through the coils of the other relay.

In connection with the local circuit of these relays I provide a recording instrument, such as "Steinheil's" or "Herring's," having two styluses actuated by independent circuits, but marking on the same traveling paper. Each relay actuates one of these styluses. The relays are wound with coils of very low resistance, say from two to five ohms, and if the transmitting instrument be sending curb-signals polarized relays are employed.

Referring to Fig. 4, R' $R^2$ are two suitable relays the coils of which are connected with the wires $B^2$, $B^3$, and $B^4$. As already stated, the resistance of the coils of these relays is unusally low, or they might be of higher resistance when employing an automatic transmitter and shunted by a low resistance. I make the connection, as shown, in such manner that when the contact-lever $h$ rests on the stop $k$ the currents traverse the coils of the relay R', while when the contact-lever $m$ rests on the stop $o$ the currents traverse the coils of the relay R². In other words, the relay R' receives and is actuated by the currents which signal dashes, and the relay R² receives and is actuated by the currents which signal dots.

It will be seen that in the position in which the relays are placed only the charge entering the cable passes through their coils, the discharge from the cable being diverted to earth through another circuit, avoiding the production of false signs in the local circuits of such relay.

H indicates the receiver. Preferably it is the instrument known as "Herring's" receiver. A short description of this instrument will suffice. It prints upon a paper tape which is slowly moved forward by clockwork. The printing instrument is a small wheel on an axis which is set lengthwise of the paper. The periphery of this wheel is kept moist with ink. The paper passes over two printing-levers. One ends in a single narrow finger, while the other lever is forked at the end. When the single lever operates, its single end rising beneath the paper lifts it into contact with the printing-wheel but at one point, and this on the center line of the paper, so a dot is printed. When instead of the single lever the forked lever rises, its two prongs press on the paper at two points, one on either side of the center, so the paper is lifted into contact with the printing-wheel as before, but the prongs also act to bend the paper somewhat to a trough-like form, and the contact with the wheel is not now at a point only, but is prolonged into a dash or sufficiently to render the dot and the dash signals easily distinguishable. There are two local electric circuits through the instrument H, as shown. One is closed by the relay R' and the other by the relay R². The local battery X is included in both circuits. The current from this battery passing through the coils of electromagnets works the printing-levers in the usual way.

When it is not required that the signals should be "curbed," there may be substituted for the two relays a compound relay having two independent coils or circuits of low resistance joined up between the transmitter or the sending-key and one pole of the battery in exactly the same way as the circuits of the two relays. The tongue of the compound relay is provided with a light spring or springs, by means of which it may be set so that when no current passes through the coils it remains in the midway position between the contact-stops and does not touch either of them; but the passage of a current through one of the circuits of the relay will move the tongue into contact with, say, the left-hand stop, and the passage of a current through the other circuit will move the tongue into contact with the right-hand stop. One pole of the local battery is connected with the tongue, the two stops of the relay being joined up with the respective coils of the recording instrument in an obvious manner.

A further obvious modification is to convert the compound relay into a recording instrument. In such case the tongue of the relay carries at the extremity remote from its axis a small tubular stylus resting lightly on a paper strip moved forward, as usual, by any suitable mechanism. The stylus acts after the manner of the siphon-recorder. It is supplied with ink, and when the relay-tongue is in the neutral position the stylus draws a straight line along the center of the paper. When a current passes through one of the circuits of the relay, the tongue carries the stylus away from the center of the paper, and the equivalent of, say, a dot is thereby made. A current through the other circuit of the relay moves the tongue and stylus in the opposite direction, and the equivalent of a dash is made. For this mode of working I prefer to use a relay in which the stylus or a siphon is carried by a movable coil wound with two circuits and suspended between the poles of a permanent or electro magnet.

The hand-key for manual transmission (shown at T in Fig. 4) is of novel construction, being adapted for use in connection with the hereinbefore-described system of preserving a record of the messages transmitted.

The front bar is divided into two parts N' N², both of which are connected with one pole of the sending-battery, not directly, however, but through the relays R' and R².

K' K² are spring-keys or contact-levers connected to line and to earth, respectively, and both when at rest are in contact with the back bar M, which is connected to the other pole of the sending-battery. When either key is depressed, it makes contact with its portion of the front bar and a signal-current passes. Thus the key K' puts, say, the copper of the battery to line through the relay R', and the key K² puts zinc to line and the copper to earth through the relay R². These relays control a recording instrument in the manner already described, and so a record is kept of the outgoing signal-currents.

What I claim, and desire to secure by Letters Patent of the United States, is—

1. In an automatic telegraph-transmitter, the combination with contact-levers, a punched paper tape and needle-levers, of cams adjustable relatively to each other, located on an arbor of the driving mechanism of the instrument, and intermediate levers each operated by one of said cams, one cam with its operated intermediate lever serving, in conjunction with the punched paper tape, to control the movements of the contact-levers in one direction, and another cam with its operated intermediate lever serving to return or reset the contact-levers to their normal positions after a regulated interval of time.

2. In an automatic telegraph-transmitter, the combination with a punched tape, needle-levers, and contact-levers operated by the needle-levers, of cams on an arbor of the driving mechanism of the instrument, an intermediate lever controlled by one of the cams and acting upon the needle-levers to normally hold the needles clear of the tape and to permit their entrance, respectively, into perforations therein, to effect the actuation of the contact-levers, and to then return the needle-levers to their normal positions irrespective of the contact-levers, and a second intermediate lever operated upon by the other cam to return the contact-levers to their normal position after a regulated interval of time, substantially as set forth.

3. In a curbing device of an automatic telegraph-transmitter, the combination of a cam carried on an arbor of the driving mechanism, a lever oscillated by said cam, and a pole-changer, said oscillating lever and pole-changer being carried by an insulating sliding block that is capable of adjustment relatively to the cam-axis, whereby said oscillating lever may be brought more or less into the path of said cam and the amount of curb regulated while the instrument is running.

4. The combination, substantially as set forth, with a telegraph-transmitter, of relays having their coils connected with one pole of the line-battery through a pole-changer which makes a single reversal for every signal that passes to line, and with the contact-points to which the contact-levers of the transmitter pass when operated to send a current to line, a local circuit completed through the tongue of one relay by the action of outgoing positive currents to line and another local circuit completed through the tongue of another relay by the action of outgoing positive currents to earth, and means in said local circuits whereby a record is preserved of such outgoing signals.

5. In combination, substantially as set forth, a telegraph transmitting-key having its front bar divided into two parts and with which parts its levers respectively come into contact when operated, relay-coils in separate branches of a divided circuit connected respectively between one part of the divided front bar and the one pole of the line-battery, two local circuits completed through the relay-tongues, and means in said local circuits whereby a message is preserved of outgoing signals.

6. The combination, substantially as set forth, with a telegraphic transmitter, of relays having their coils connected with the same pole of the line-battery and respectively with the contact-points to which the transmitter contact-levers pass when operated to send a current to line, the opposite or back contacts of such levers being respectively connected to the other pole of said battery, and one lever being connected to earth, and the other to line, a local circuit completed through the tongue of one relay by the action of outgoing positive currents to line, and another local circuit completed through the tongue of another relay by the action of outgoing positive currents to earth, and means in said local circuits whereby a record is preserved of such outgoing signals.

7. In combination, an automatic telegraph-transmitter, means for preserving a record of outgoing signals, relays operating through their tongues to close local circuits and bring into action said recording means, a transmitting-key with its front bar divided and the coils of a relay in circuit between each of those divisions and the one pole of the line-battery, and a switching device serving to put either the automatic transmitter or the transmitting-key into circuit.

In testimony whereof I have hereunto subscribed my name.

HERBERT ARNAUD TAYLOR.

Witnesses:
A. F. SPOONER,
ARTHUR D. CARLOVE.